April 26, 1960   H. HACK   2,933,984
METHODS AND APPARATUS FOR COMPENSATION OF ROTOR UNBALANCE
Filed Aug. 29, 1956   7 Sheets-Sheet 1
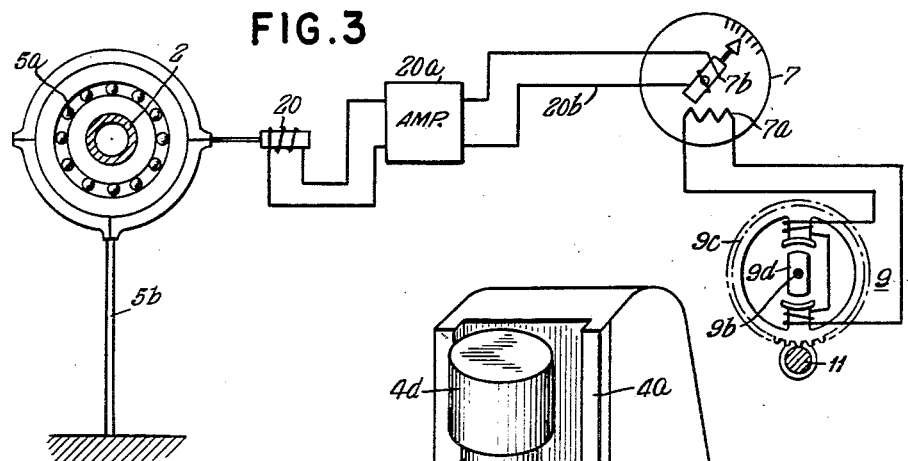
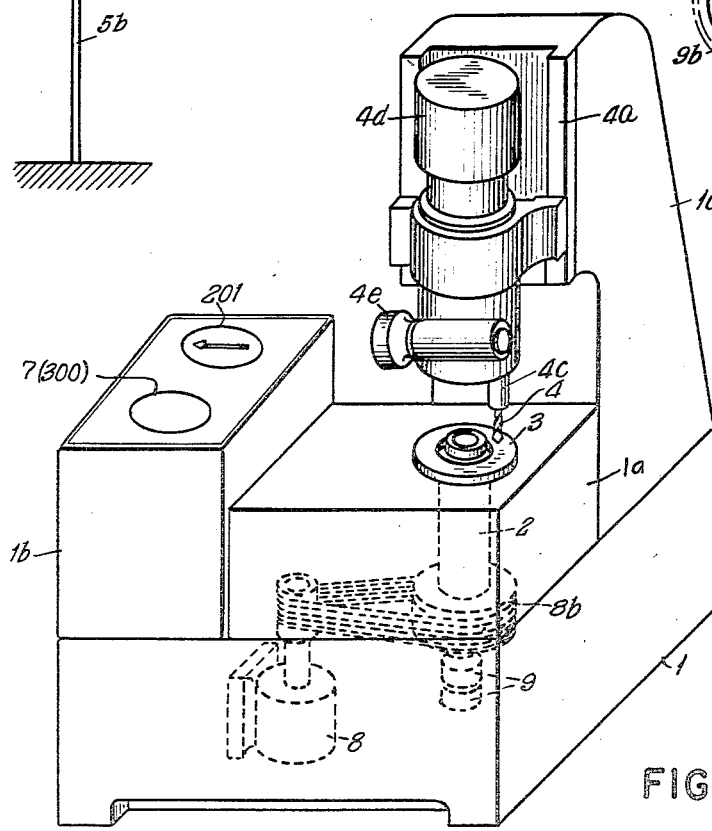

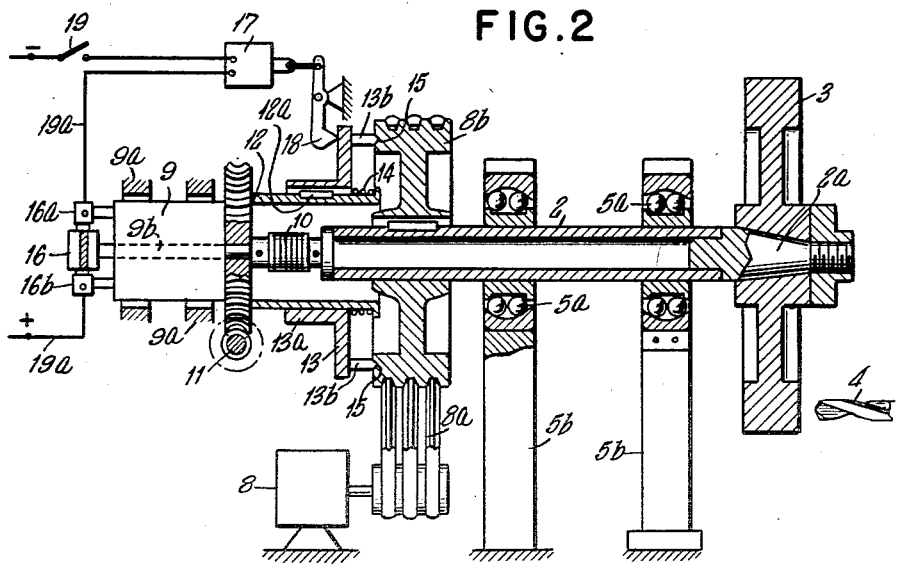

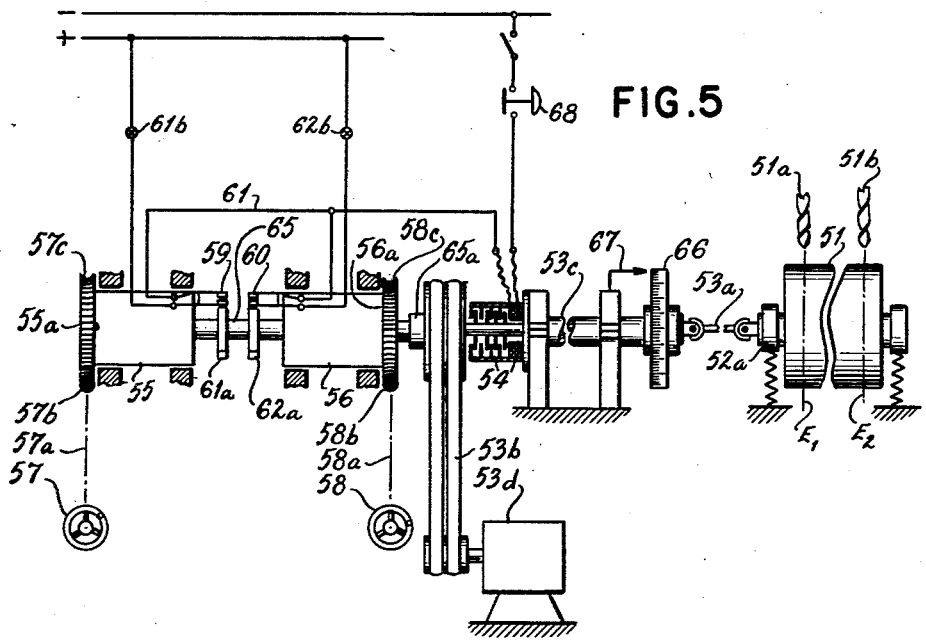
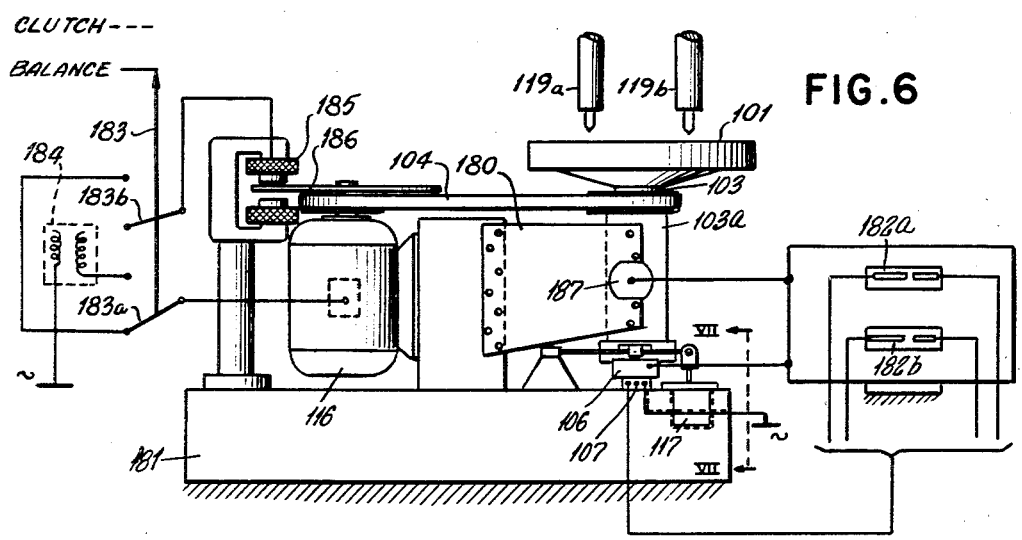

April 26, 1960     H. HACK     2,933,984
METHODS AND APPARATUS FOR COMPENSATION OF ROTOR UNBALANCE
Filed Aug. 29, 1956     7 Sheets-Sheet 4

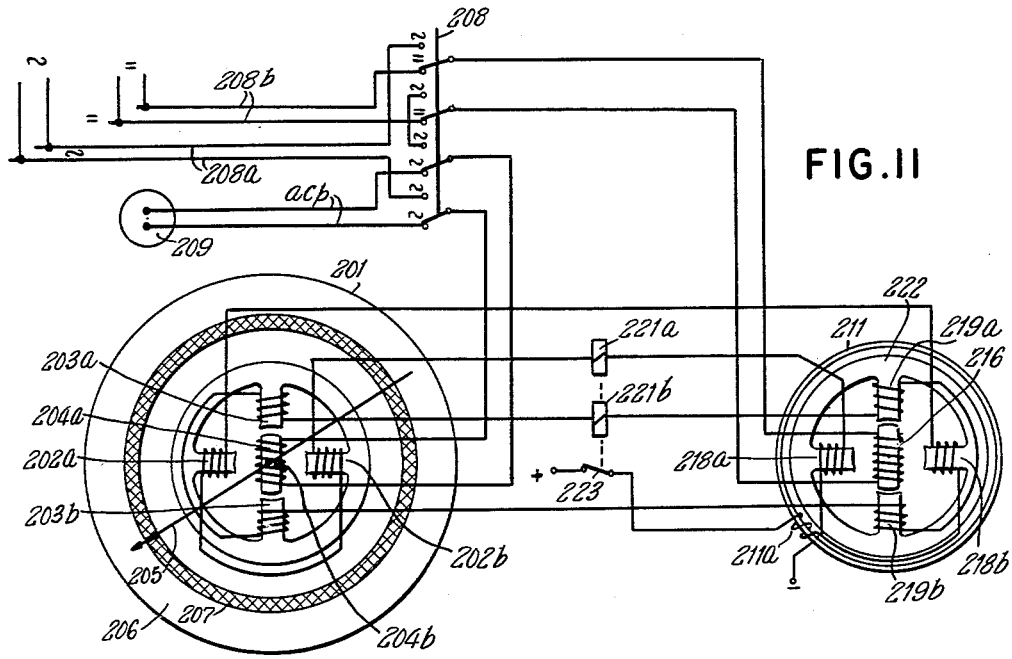
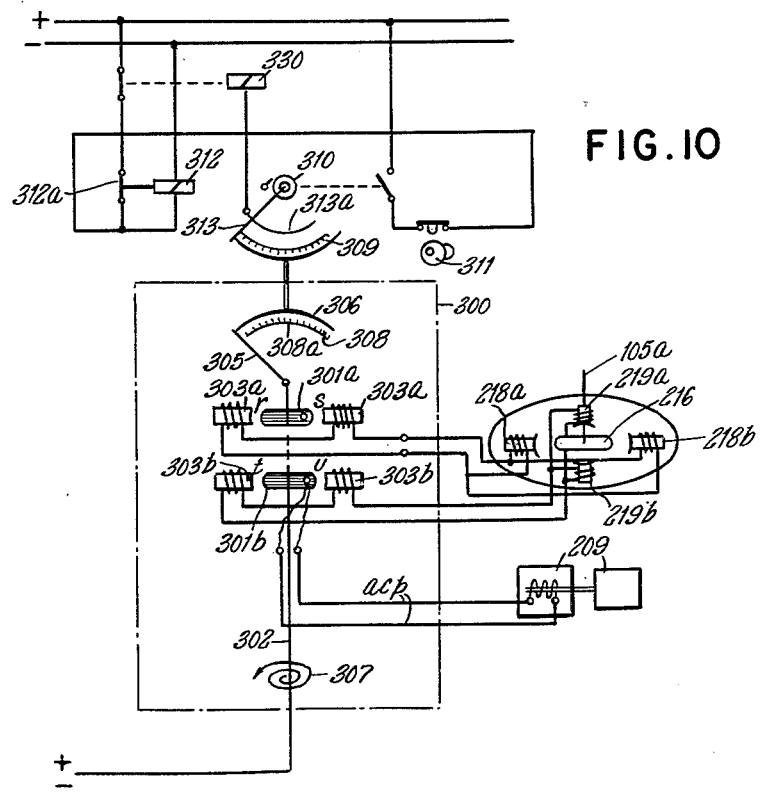

April 26, 1960    H. HACK    2,933,984
METHODS AND APPARATUS FOR COMPENSATION OF ROTOR UNBALANCE
Filed Aug. 29, 1956    7 Sheets-Sheet 6

April 26, 1960  H. HACK  2,933,984
METHODS AND APPARATUS FOR COMPENSATION OF ROTOR UNBALANCE
Filed Aug. 29, 1956  7 Sheets-Sheet 7

United States Patent Office 2,933,984
Patented Apr. 26, 1960

2,933,984

METHODS AND APPARATUS FOR COMPENSATION OF ROTOR UNBALANCE

Heinrich Hack, Darmstadt, Germany, assignor to Carl Schenck Maschinenfabrik G.m.b.H., Darmstadt, Germany, a corporation of Germany Application August 29, 1956, Serial No. 606,929

Claims priority, application Germany November 7, 1955

23 Claims. (Cl. 90—11)

My invention relates to methods and apparatus for determining any unbalance of a rotating body as to magnitude and angular position of such unbalance, and for controlling the machining or other fabricating operation required for eliminating such unbalance in accordance with the previously measured unbalance values.

The conventional rotor-balancing techniques are mainly based upon two generally known principles of determining the magnitude and angular position of unbalance. One of these is the component measuring method based upon Cartesian coordinates, which also includes the vectorial measuring method as described in U.S. Patent No. 2,722,830; the other main principle is the so-called polar method based upon polar coordinates.

According to the component measuring method, the oscillatory amplitude of the rotating body, indicative of the magnitude of unbalance, is measured at two mutually phase displaced moments involving in most cases a phase displacement of 90°. These measurements permit determining in known manner (see, for instance, German Patent No. 745,193) the amplitudinal magnitude and the angular position of the unbalance. The polar method is essentially electrtical and involves the use of an auxiliary alternating-current generator whose rotor is driven in synchronism with the body being analyzed for unbalance. The stator of the generator is angularly displaceable and, during the measuring run, is rotationally adjusted until the measuring instrument, for instance a wattmeter, responding to unbalance-responsive currents or voltages from an oscillation pick-up, indicates an extreme value, namely either a maximum or zero. Then the angular displacement of the stator from its null position is an accurate measure of the angular position of the unbalance. For that reason the auxiliary generator is often called a "phase-reference transmitter" or simply "phase transmitter."

The (Cartesian) component method is mainly used in cases where the elimination of unbalance is limited to predetermined locations of the body to be balanced (prelocated unbalance compensation). For bodies of other types, however, the polar measuring method is often preferable.

After the angular location and the magnitude of an unbalance are determined in accordance with any of the above-mentioned methods, such unbalance is eliminated by a subsequent fabricating operation which either removes material from, or adds material to, a proper location of the body to be balanced. The removal of material may be effected by drilling. The addition of material may be effected by attaching compensating weights, or by welding material to the body. In all such cases, the unbalance removing device must act upon the accurately located spot of the body to be balanced.

With reference to such unbalance removing operations, my invention, more particularly, relates to the control of the fabricating operation for balancing a rotatable body that has previously been tested for unbalance by means of wattmetric or other instruments which cooperate with an auxiliary electric generator (phase transmitter) to determine the angular location of the mass center of such unbalance and preferably also the magnitude of unbalance.

It is among the objects of my invention to improve such controls toward greater accuracy and to minimize the skill and attention required for performing and supervising the balancing operation. Another object of my invention is to afford a completely automatic unbalance eliminating operation. Further objects will appear from, and will be mentioned in, the following.

The method and apparatus according to the invention are predicated upon measuring the unbalance of a rotating body on a balancing machine, as regards angular position and magnitude of the unbalance, with the aid of one or more auxiliary alternating-current generators to serve as phase transmitter and one or more vibration pick-ups for transmitting electric intelligence indicative of the unbalance to be determined. According to a feature of my invention, I provide a controllable arresting device between the angularly displaceable stator of the generator, on the one hand, and the rotor body being processed or a part of a balancing machine running in synchronism with that body, on the other hand. The arresting device serves to block the body, hereinafter called "workpiece," in the proper machining or fabricating position and possesses a member that is angularly displaceable in accurately fixed relation to the angular displacement of the generator stator. When this member occupies a position indicative of the unbalance angle, it is put into clutching engagement with the workpiece holder, preferably by release of an electric control effect, thus reliably blocking the workpiece in the correct angular position for unbalance-compensating operation.

According to another feature of my invention, the angular position and magnitude of the rotor unbalance are first individually determined by means of two preferably wattmetric instruments whose respective moving coils receive alternating current from vibration pick-ups and whose respective stationary field coils receive sinewave current and cosine-wave current from an auxiliary generator assembly whose field poles are excited by direct current, whereas for controlling the subsequent unbalance-removing operation, the generator field and the moving coil of the unbalance-angle indicating instrument are both supplied, preferably automatically, with alternating currents of the same frequency and phase. As a result, inductive currents of respectively different voltages are induced in the generator output circuit and in the stationary coils of the instrument respectively, which inductive currents are then reduced to zero by turning the workpiece and hence the rotor of the generator into an angular position that corresponds exactly to the angular position of the then arrested moving coil of the unbalance-angle indicating instrument. Thereafter, the rotor to be balanced is blocked by the arresting device, for instance by actuation of a relay, whereafter the position of the workpiece is accurately fixed as needed for performing the unbalance eliminating operation.

The foregoing and other features of my invention, set forth with particularity in the claims annexed hereto, will be apparent from the embodiments illustrated by way of example of the drawings in which:

Fig. 1 shows in perspective a machine designed and operating in accordance with the invention; Fig. 2 relates to a portion of the same machine and shows schematically an arresting device and other components designed for balancing operation in accordance with the polar method; and Fig. 3 shows an explanatory circuit diagram also relating to the same machine.

Figs. 4 and 5 illustrate, partly in section, two other modifications of apparatus according to the invention, both comprising arresting devices for the polar balancing method.

Figure 7:
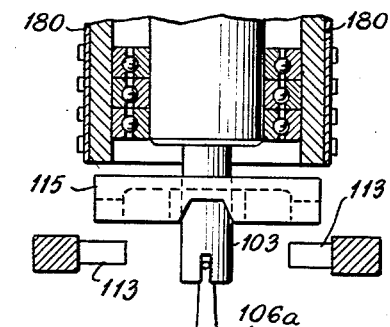
Figure 8:
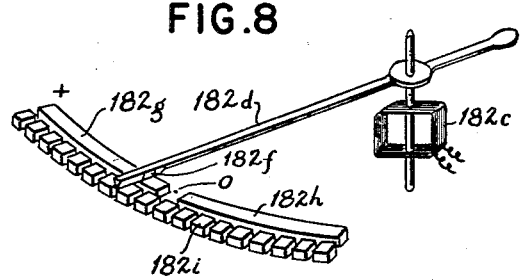

Fig. 6 illustrates schematically a front view of an automatically operating machine equipped with an arresting device for operation in accordance with the component measuring method; Fig. 7 shows, partly in section, a portion of the machine located between, and seen in the direction of, the two arrows VII—VII indicated in Fig. 6; and Fig. 8 is a schematic and perspective view of a wattmetric control instrument forming a component of the same machine.

Figure 9:
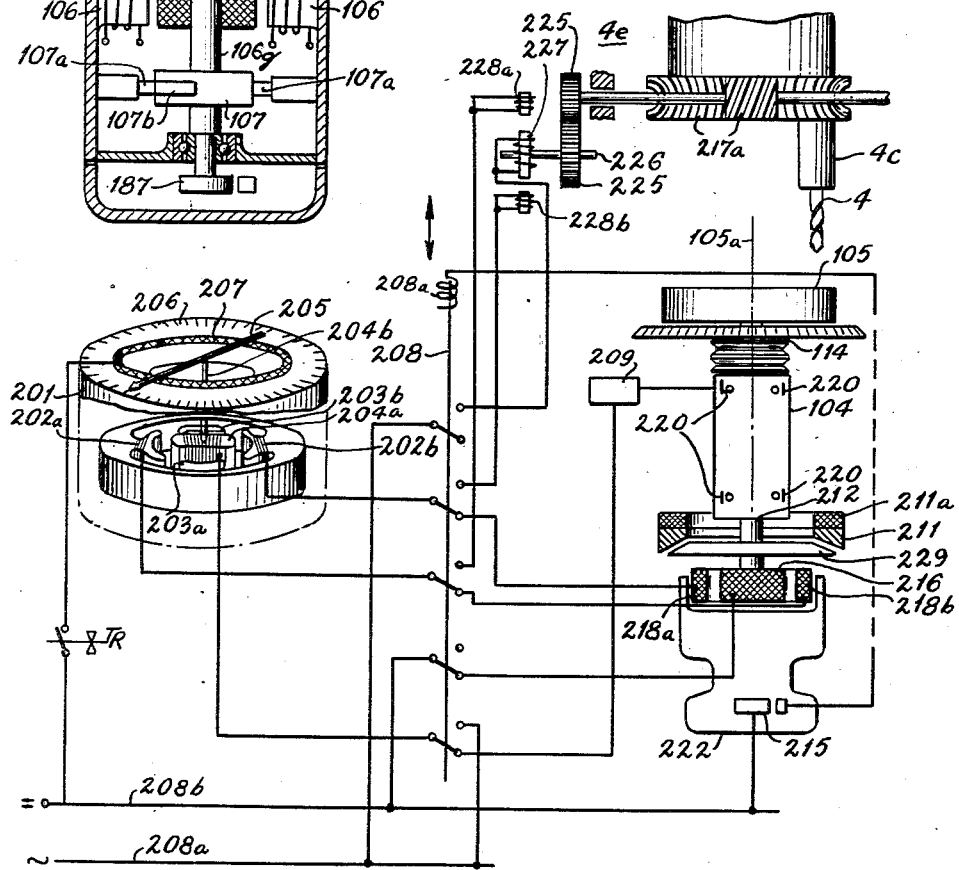

Figs. 9, 10 and 11 illustrate another balancing machine which, as regards overall appearance corresponds to the machine illustrated in Fig. 1 but comprises a number of refinements and improvements as regards interior equipment. More specifically, Fig. 9 shows diagrammatically, partly in section and partly perspectively, an apparatus for automatically arresting the workpiece in the proper angular position and controlling the subsequent upbalance compensating operation; and Figs. 10 and 11 are schematic circuit diagrams respectively, involving the same apparatus as well as other components of the machine.

Figure 12:
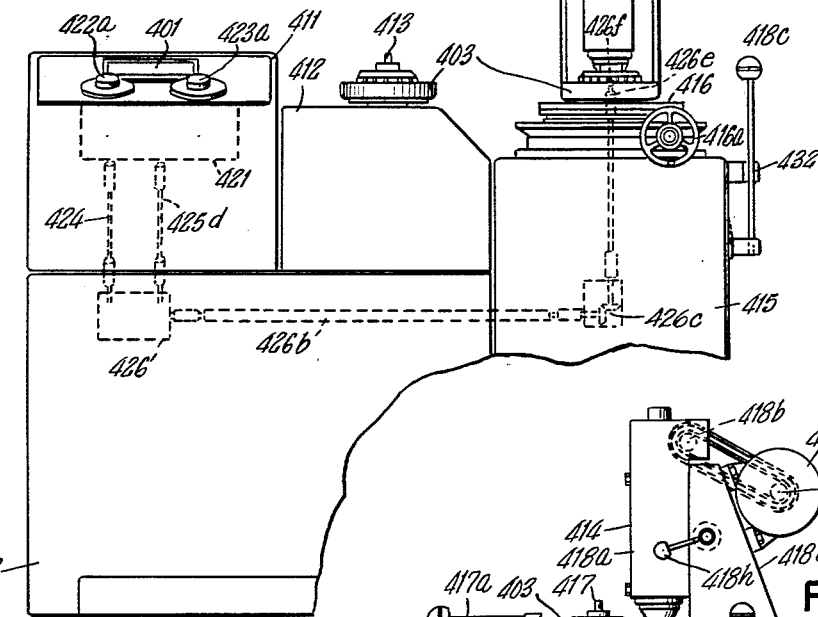
Figure 13:
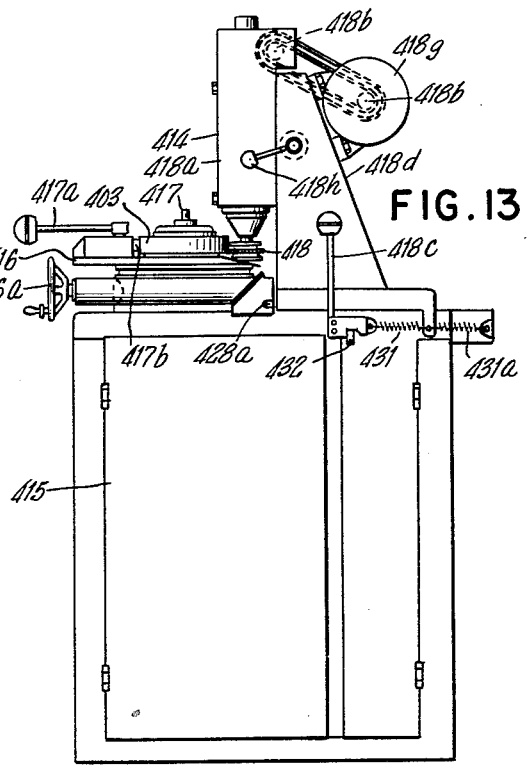
Figure 14:
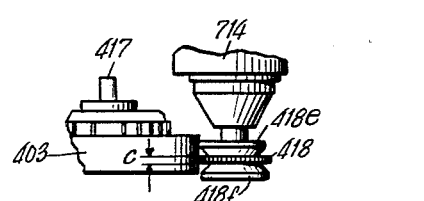
Figure 15:
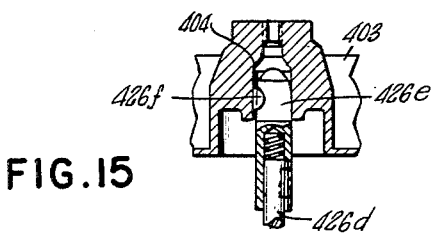
Figure 16:
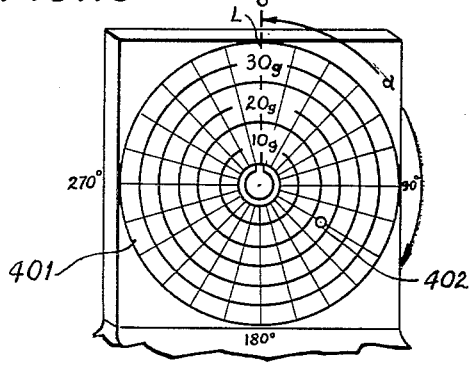
Figure 17:
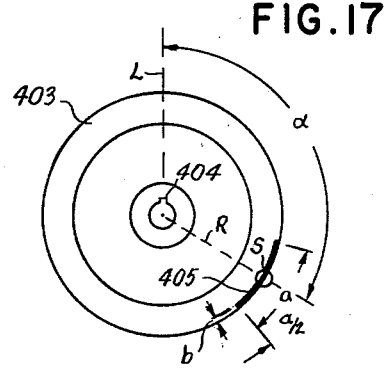
Figure 18:
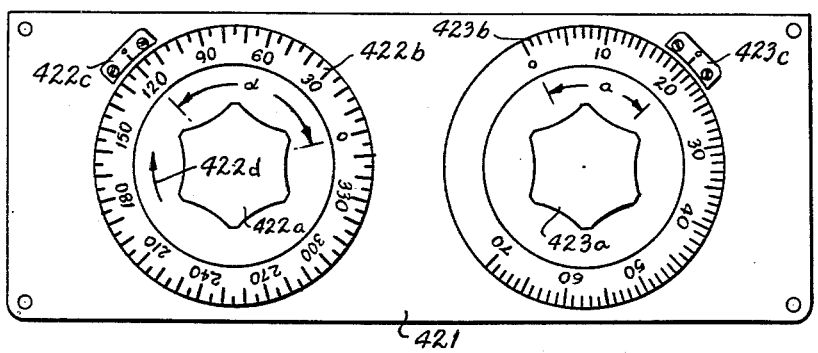
Figure 19:
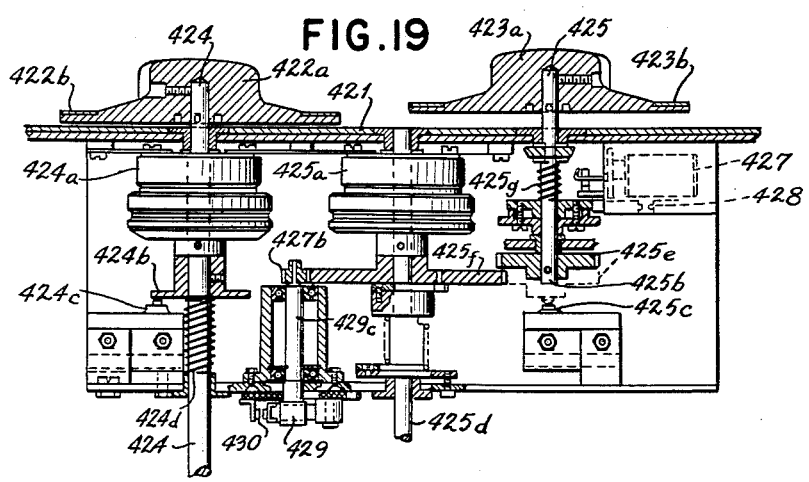

Figs. 12 to 19 relate to machinery comprising a balancing machine joined with a balance-correcting milling machine into which the workpiece is transferred after being balance-analyzed, the machine set being provided with devices for causing the workpiece, when being inserted into the separate milling machine, to automatically occupy the correct angular position. More specifically, Fig. 12 is a front view and Fig. 13 a side view of the entire machine; Fig. 14 shows a detail of Fig. 13 on larger scale; Fig. 15 is a sectional illustration on larger scale of a detail of Fig. 12; Fig. 16 is a front view of a vector indicating instrument forming part of the balancing machine; Fig. 17 is a diagram explanatory of the required balance correcting operation of the milling machine; Figs. 18 and 19 are a top view and a partly sectional side view of a position transferring device.

The machine illustrated in Fig. 1 comprises a base structure 1 on which are mounted the housing 1a of a balancing apparatus, the housing 1b of an electric balance analyzing set, and the standard 1c of a balance-correcting machine tool. Vertically journaled in housing 1a is the carrier and drive shaft 2 for the workpiece 3 to be balanced. The workpiece is shown to consist of a disc-shaped body 3 such as a belt sheave or fly wheel. It is firmly secured to the conical top end 2a (Fig. 2) of shaft 2. The standard 1c is provided with a vertical slide-way 4a for the support of a drill carrier 4c on which the drilling tool 4 is mounted and which is driven by an electric motor 4d. The drill carrier is vertically displaceable by means of a feed control device 4e.

The carrier shaft 2 for the rotor 3 is elastically journaled in the manner illustrated in Fig. 2. Seated upon the shaft 2 are two ball bearings 5a which have their respective outer races mounted on leaf springs 5b (Figs. 1, 3) so that the shaft and workpiece assembly, driving rotation, can oscillate in a plane perpendicular to the plane of illustration in Fig. 2. Such oscillations, due to unbalance of the workpiece, are responded to by oscillation pickup means, such as an electrodynamic moving-coil pickup, which produces a corresponding electric voltage. This voltage is supplied to the electric analyzing system located in housing 1b (Fig. 1) where the amount and angular position of unbalance are indicated by an instrument 7.

When in operation, the workpiece carrier 2 is driven by an electric motor 8 through drive belts 8a and a belt sheave 8b. The electric generator 9 for supplying the balance analyzing system in housing 1b with an alternating current whose phase position relative to the rotor rotation serves as an angular reference, is mounted in coaxial relation to the carrier shaft 2. The rotor shaft 9b (Figs. 2, 3) of generator 9 is connected with the carrier shaft 2 by a coupling 10 and hence rotates in synchronism with the workpiece 3. The stator 9c (Fig. 3) of generator 9 is displaceable about the generator axis. Angular displacement of the stator and thus of the salient poles of that stator, is effected by a preferably self-locking worm gear 11. Operation of worm gear 11 has the effect of turning the stator of generator 9 in the generator bearings 9a (Fig. 2) with the effect of changing the phase position of the generated current relative to the rotation of the workpiece as required for the balance analyzing operation.

Firmly connected with the housing of the generator 9 and hence with the rotatable stator is a sleeve 12. A flange 13 provided with a hub portion 13a and with axially projecting clutch pins 13b is axially displaceable on sleeve 12 but is prevented by key means 12a from rotating relative to the sleeve. A helical pressure spring 14 forces the flange 13 toward the left so that the pins 13b are normally kept out of corresponding recesses 15 in the adjacent front face of belt sheave 8b. The rotor shaft 9b of generator 9 carries outside the generator housing a switch 16 which has stationary contacts 16a and 16b mounted on the housing of generator 9. During rotation of carrier shaft 2 the switch 16 rotates and establishes by its rotating member a contact connection between stationary contacts 16a and 16b only when the workpiece is in the proper angular position. After termination of a measuring run; that is, after the worm gear 11 has been actuated to make the instrument 7 (Figs. 1, 3) indicate the magnitude and angular position respectively of any unbalance of workpiece 3, the flange 13 (Fig. 2) is moved in opposition to the force of spring 14 against the belt sheave 8b. This is done by means of an electromagnet 17 acting through a lever 18 upon the flange 13. The clutch pins 13b may then enter into the recesses 15 of sheave 8b. In the illustrated embodiment, the actuation of the electromagnet 17 takes place when a control switch 19 is closed and the workpiece 3 is set to the particular angular position in which the switch 16 interconnects the contacts 16a and 16b thus completing an energizing circuit 20 for the electromagnet 17.

The apparatus according to Figs. 1 and 2 is particularly adapted for the polar analyzing method as exemplified by the schematic circuit diagram illustrated in Fig. 3. Only the essential circuit components, interconnected and in operation when determining the unbalance, are shown.

The instrument 7 is essentially a wattmeter with a stationary current coil 7a and a movable voltage coil 7b. The voltage coil 7b is connected through an amplifier 20a with the vibration pickup 20 that produces alternating voltage in response to any unbalance vibrations of the carrier shaft 2 caused by unbalance of the workpiece mounted on that shaft and rotating together therewith. The stationary coil 7a is traversed by alternating phase-reference current supplied from generator 9. This generator is shown to have a rotor 9d consisting of a permanent magnet which is mounted on the rotor shaft 9b. As explained above with reference to Fig. 2, the shaft 9b is connected with the movable member of switch 16. The stator 9c (Fig. 3) of the generator, also as explained, is rigidly connected with the stationary contacts 16a and 16b (Fig. 2) and can be rotated by means of the worm drive 11.

Since the rotor 9b of generator 9 is driven exactly at the frequency of workpiece revolution, the pickup voltage applied to the wattmeter moving coil 7b and the generator voltage applied to field coil 7a have the same frequencies. The deflection of the wattmeter moving coil 7b is proportional to the product of these two voltages times the cosine of the phase between them. Consequently, when the two voltages are exactly in phase, the wattmeter indicates zero regardless of the magnitude of the pickup voltage. Consequently, when during balancing operation, the phase position of the generator voltage is changed by actuation of the worm drive 11, the stator of the generator can be adjusted to such an angular position that any wattmeter indication previously observed is reduced to zero. Then the position of the stator 9c is indicative of the angular location of the unbalance to be determined.

The instrument 7 and the phase-transmitter (generator) 9 are also used for determining the magnitude of unbalance. For this purpose it is only necessary to rotate the stator 9c by means of the worm drive 11 to such an angular position that the unbalance-responsive indication of instrument 7 is a maximum. The amount of this maximum is then indicative of the magnitude of unbalance.

The operation of the apparatus shown in Figs. 1 to 3 is as follows:

The workpiece 3 to be balanced is to be firmly secured to the conical end 2a of carrier shaft 2, then the drive motor is switched on. When the workpiece rotates at the normal speed, the attendant observes the instrument 7 and actuates the worm drive 11 until the instrument pointer shows a maximum deflection. The instrument scale, calibrated in units of unbalance magnitude, such as grams or fractions of an ounce, then indicates a value indicative of the amount of material to be removed from the workpiece. This value is transmitted into the drill press to determine the depth limit for the subsequent drill feed. In principle, this can be done by manual adjustment, although I prefer using a semi-automatic setting of the drill feed such as known from U.S. Patent 2,682,046, or, above all, a full-automatic control of the feed as will be described below with the more refined control system shown in Figs. 9 to 11.

After the amount of unbalance is thus determined, the attendant actuates the worm drive 11 so as to reduce the indication of instrument 7 to zero by proper adjustment of the generator stator. The angular displacement of the stator has the effect that the sleeve 12 and the flange 13 with its pins 13b is set to a definite angular position with respect to the drill 4. Once the instrument 7 is zeroed in this manner, the attendant stops the drive motor 8 and thereafter turns the workpiece 3, for instance manually, until the circuit 19a is closed through switches 19 and 16. The control switch 19, normally open, may be closed manually, but it may also automatically close, for instance, under control by a centrifugal switch when the workpiece 3 coasts down to standstill. Such an automatic operation will be described below with reference to Fig. 9. The closing of circuit 19a causes the magnet 17 to actuate the lever 18 and to force the flange 13 with pins 13b in opposition to spring 14 into locking engagement with the recesses 15 of sheave 8b. The tips of pins 13b as well as the recesses 15 are preferably made conical in order to secure an accurate setting of the sheave 8b relative to the angularly pre-adjusted pins 13b. As a result, the sheave 8b and thus also the carrier shaft 2 with the workpiece 3 are arrested accurately in the predetermined angular position. The proper engagement of the latching pins 13b with the recesses of sheave 8b may be indicated to the operator by means of a signal lamp (not illustrated).

The workpiece 3 is now correctly oriented for the unbalance removing operation and is so arrested that it cannot turn about its axis during that operation. The drill press is now operated and the drill bit 4 now enters exactly into the too-heavy location of the workpiece to remove material in accordance with the precedingly determined magnitude of unbalance.

The locking of the rotor is subsequently eliminated by opening the control switch 19, whereupon the spring 14 is effective to remove the flange 13 and the pins 13b from latching engagement with the sheave 8b.

It should be understood that the vertical arrangement of the carrier shaft 2 and the vertical arrangement of the drill press according to Fig. 1 are not necessarily required for the purposes of the present invention; and this also applies to the use of a material-removing fabricating operation. As will be described below, the balancing unit proper as well as the fabricating unit may be of any other desired type and design. For instance, the elimination of the measured unbalance may also be effected by adding material to the too-light location of the rotor, for instance by means of a welding device. The balance eliminating fabrication can be initiated automatically and can also be automatically controlled as regards the quantity of material being removed from or added to the rotor to establish the desired balance, for instance by analogously applying the method and devices known from German Patent No. 925,255.

The embodiments illustrated in Figs. 4 and 5 exemplify the application of the invention for unbalance compensation in two correction planes. The embodiment according to Fig. 4 is provided with two arresting devices cooperating with a single phase transmitter, whereas according to Fig. 5 a separate phase transmitter is used for each of the two correction planes.

Referring to Fig. 4, the workpiece 21 to be balanced is journaled for rotation in oscillatory bearings 22a, 22b of a balancing machine. For obtaining dynamic balance, the balance correcting operations are to be performed in two correction planes indicated by dot-and-dash lines and denoted by $E_1$ and $E_2$ respectively; and it will be understood that the unbalance of the rotor 21 must accordingly be analysed separately for each of the two correction planes. The work-pece 21 is driven through a Cardanic connection or universal joint 24a from a drive shaft 24c which carries a belt sheave 24b driven by an electric motor 24d. The belt sheave 24b is provided on both sides with respective pairs of clutch pins 23 for cooperation with recesses 25 in respective clutch discs 25a and 25b. Each of discs 25a and 25b has a hub portion mounted on a sleeve 26a or 26b and is axially displaceable on the sleeve against the force of a helical spring 29a or 29b. The clutch discs 25a and 25b are prevented from rotating relative to the respective sleeve 26a, 26b by means of keys 27a, 27b. Each sleeve is rotatably journaled in a bearing 30a or 30b and can be rotated at will by means of a worm gear 31a or 31b and a worm 32a or 32b.

A flexible shaft 33 or similar coupling connects the armature 34a of a phase transmitter generator 34 with the shaft 24c so that the generator is driven in synchronism with the workpiece 21. The stator 34b of phase transmitter 34 is provided with a worm gear 35 so that it can be angularly displaced by means of a worm 35a. Mounted upon the shaft of the phase transmitter is a contact disc 36a which has a contact point that, in the proper angular position of disc 36a, electrically engages a contact 37a mounted on the worm gear 31a. A similar contact is mounted at the opposite side of the assembly upon the worm gear 31b, and the shaft 24c is provided with a contact disc 36b whose contact point 37b can engage the contact of disc 36b.

The worm 35a is operated in constrained relation to the operation of either one of the worms 32a and 32b. For this purpose a bevel gear transmission is provided which can be actuated by means of a hand wheel 44. The shaft 42 of hand wheel 44 is rotatable as well as axially displaceable and possesses three selective positions into which it can be placed together with the hand wheel 44 and which are secured by means of a snap latch 42a. These three selective positions are denoted by, I (unbalance measuring in plane $E_1$), II (unbalance measuring in plane $E_2$) and III (idling). The worm 35a is continuously coupled with shaft 42 through the transmission 35b and a Cardanic coupling 35c. When the shaft 42 is latched in position I, the worm 32a is connected with shaft 42 through a transmission 32aa and a coupling latch 32', and hence is also connected with the worm 35a; so that the sleeve 26a can be turned about its axis together with the stator 34b by actuation of the hand wheel 44. When the shaft 42 is arrested in position II, the worm 32b is coupled through a transmission 32bb and a connecting latch 32'' with the shaft 42 as well as with the worm 35a. Only in these two given positions can either the worm 32a or the worm 32b be connected with the shaft 42.

When using the apparatus, the magnitude and angular location of any unbalance with which the workpiece 21 may be affected, are measured in the manner described above with reference to the embodiment of Figs. 1 to 3 except, that the measuring operation is to be performed for each of the two planes of reference or correction planes $E_1$ and $E_2$. For this purpose, the balance analyzing system, otherwise in accordance with the one shown in Fig. 3, must be provided with two oscillation pickups (20) located in the two correction planes $E_1$ and $E_2$ respectively, and a selector switch is connected between the wattmetric instrument (7) and the two pickups to connect only one pickup with the instrument at a time. However, this particular unbalance system is not essential for the present invention, various systems being known and applicable, for instance those according to U.S. Patent 2,720,781 and U.S. Patent 2,722,830.

After completing a balance measuring operation relative to one of the correction planes, for instance plane $E_1$, and after the drive motor 24d is de-energized, the work-piece 21 is turned slowly about its axis. This is done by means of a reduction-gear motor 45. Simultaneously, the circuit for disc 36a and contact disc 37a as well as for the electromagnet 39a is closed by means of a switch 41a, this may be done either manually, by a timing relay or by a centrifugal switch responding when the workpiece 21 reduces its speed to a desired value. When, during slow rotation of workpiece 21, the contact on disc 36a engages the contact 37a, a signal lamp 38a is lit and the electromagnet 39a is energized. The armature of magnet 39a operates upon an angular lever 40a and forces the clutch disc 25a, in opposition to the force of spring 29a, against the pins 23 of sheave 24b so that the pins 23 enter the recesses 25.

In an analogous manner, during balancing operation relative to the correction plane $E_2$, the circuit for the contact disc 36b and the contact 37b on the hollow shaft 26b are closed by the switch 41b. Then the lamp 38b and the magnet 39b are energized. The magnet displaces the angular lever 40b and thus also the clutch disc 25b so that the pins 23 of sheave 24b enter into the recesses 25 of clutch disc 25b.

After each such arresting operation, the balance-correcting operation, effected by means of drills 21a or 21b is controlled either automatically or by manual control as described above with reference to the embodiment of Figs. 1 to 3. The accurate setting of the workpiece 21 to the correct angular position in which the workpiece becomes arrested is secured by giving the clutch pins 23 and the recesses 25 self-centering conical shape.

Two signal lamps 38a and 38b are preferably installed near the left and right bearing supports respectively of the balancing machine in order to indicate to the attendant the particular correction plane for which the coordinated arresting device is in operation. The machine shaft 24c preferably carries a disc 46 with a scale of angular indicia cooperating with a stationary pointer 47 to facilitate proper checking of the angular position of the workpiece being processed.

According to Fig. 5 the workpiece 51 to be balanced is journaled in oscillatory bearings 52a and 52b and is driven through a cardanic coupling shaft 53 from a drive shaft 53c which in turn is driven by a belt transmission 53b from a motor 53d. The drive shaft 53c carries the interior portion of a laminated electromagnetic brake 54.

A separate generator 55 or 56 is provided for each of the two correction planes $E_1$ and $E_2$ to serve as a phase transmitter. The rotors of the two generators are rigidly interconnected by a shaft 65 which is joined with the drive shaft 53 by a coupling 65a. The stator of each phase transmitter is angularly adjustable by means of a hand wheel 57 or 58 through a flexible shaft 57a or 58a which actuates a worm 57b or 58b that meshes with a worm gear 57c or 58c secured to the housing 55a or 56a of the phase transmitter. Fastened to the housing of each phase transmitter is a spring contact device 59 or 60. The two contact devices are connected with a current supply lead 61 and participate in each angular adjustment of the transmitter housing on which the respective devices are mounted. Secured to the connecting shaft 65 are two contact cams 61a and 62a for actuating the respective contact devices 59 and 60. After completion of a measuring run, a switch 68 is closed, for instance manually or automatically by a centrifugal switch as explained above. Switch 68 then energizes the lead 61 from a current-supply line with the result that the one signal lamp 61b or 62b whose spring contact is then closed by the cam 61a or 62a is lit. Simultaneously the magnetic brake 54, connected in the same circuit, is also energized and arrests the workpiece 51 in the correct angular position for the balance correcting operation to be effected, for instance, by one of the illustrated drills 51a or 51b.

The operation of the apparatus therefore is essentially similar to that of the machines according to the preceding embodiments. By angularly displacing the stator of one of the phase transmitters 55 and 56 at a time, the amount and the angular position of unbalance are determined for each correction plane with the aid of the wattmeter indication as explained above; and the contact device 59 or 60 is simultaneously so adjusted that its angular position relative to the workpiece to be balanced coincides with the angular position of the unbalance in the one correction plane $E_1$ or $E_2$ being under observation at a time. By means of an angular scale on a disk 66, cooperating with a stationary pointer 67, the proper position of the workpiece can always be supervised.

For obtaining a proper positioning to the correct angle, the above-mentioned conical clutch pins and recesses according to Figs. 2 and 4 may be replaced by a system of signal lamps or similar signalling devices. For instance, the lighting of a red lamp may indicate to the attendant that the workpiece is ready to be slowly turned toward the arresting position in which the magnet 54 is to respond. Another lamp of different color may then indicate when the proper angular position of the workpiece is reached.

It will be recognized from the embodiments so far described in detail, that the invention permits placing the workpiece into the proper position for balance correcting operation without requiring any calculation or evaluation of the unbalance measuring results by the attendant, and that the rotor is automatically and reliably arrested in the proper position during the unbalance eliminating operation. In the embodiments described so far, the slow turning of the rotor to be balanced into the correct position needed for the unbalance removing drilling, welding or other operation is effected either manually or by means of an electric motor to be controlled by the attendant until the arresting device becomes clutched in or the proper signal is issued. However, according to another object of my invention, a signal representing the angular position and magnitude of unbalance measured may also be automatically transmitted to the device for turning the workpiece into the proper unbalance-eliminating position, or to the device for eliminating the unbalance condition. According to another feature of my invention, therefore, the setting of the workpiece to the angular position required for accurate unbalance elimination is automatically effected by one or more measuring instruments which are equipped with contact arms at the rotating part of the instrument. According to further features of the invention relating to the same object, the adjustment of the workpiece to the correct angular position for balance correction is carried out during the balance-measuring run with the aid of the same drive that rotates the workpiece during that measuring run; and means are provided for producing a braking torque which imparts to the drive the slow speed desired for the subsequent workpiece-setting operation.

The embodiment of Figs. 6, 7 and 8 incorporates the just-mentioned features of the invention.

According to Fig. 6, the workpiece 101 to be balanced is mounted on a carrier shaft 103 driven by a belt transmission 104 from an electric motor 116. The bearing assembly 103a of shaft 103 is secured to the machine base 181 by means of flat springs 180. The bearing oscillations due to unbalance of the workpiece 101 are translated into electric voltage by means of an oscillation pickup 187. The pickup voltages are supplied to electric measuring instruments 182a and 182b, preferably of the wattmetric type, for measuring and, if desired, for also indicating the unbalance values. Mounted at the lower end of shaft 103 is an alternating-current generator 106 (Figs. 6, 7) to serve as a phase transmitter. Generator 106 is connected with shaft 103 by a cardanic coupling or universal joint 106a (Fig. 7) so that the rotor shaft 106g of the generator runs in synchronism with, and in a fixed phase relation to, the workpiece-carrier shaft 103. The phase transmitter 106 has two stator windings or two stators which are 90° phase-displaced relative to each other in accordance with the principle apparent from the corresponding generator shown in Fig. 11 and described below. As a result, the phase transmitter 106 (Figs. 6, 7) supplies a sine-wave voltage to the measuring instrument 182a and a cosine voltage to the measuring instrument 182b, or vice versa. Both measuring instruments are designed as contact wattmeters as shown in Fig. 8 by way of example.

According to Fig. 8, showing only a portion of one of the two instruments, the movable instrument system comprises a moving coil 182c and a contact arm 182d rotating together with coil 182a. The zero position (0) of arm 182d is located in the mid-position of the deflecting range. Arm 182d carries a contact 182f which may enter into contact engagement with one or the other of two elongated contact bars 182g and 182h, depending upon whether arm 182b is deflected toward the plus (+) or minus (—) direction from the zero position. The contact 182f is further engageable with any one of a number of mutually insulated contacts 182i, depending upon the direction and amount of deflection. Instead of having the contact 182f of arm 182d in continuous sliding contact with the stationary contacts, I prefer using a design in which the contact 182f is normally free to move over the stationary contacts without engaging them and is then intermittently pressed against the stationary contacts by a setting member or dropping stirrup as is conventional for such instruments. Depending upon which of the stationary contacts 182g and 182h is contacted at a time in the two instruments, these instruments permit selectively controlling the arresting device for the workpiece 101 as regards four different arresting positions relative to the unbalance eliminating tools, here consisting of drills 119a and 119b (Fig. 6). The electric impulses issuing from the instruments 182a and 182b are supplied to a commutator switch 107 (Figs. 6, 7) driven by the phase transmitter 106. The collector switch 107 passes the impulses through an electromagnet 117 when the workpiece 101 reaches the correct angular position required for the balance correcting operation. The commutator switch 107 is mounted on the shaft 106g of the phase-transmitter and rotates between two carbon brushes 107a. A portion of the periphery of commutator switch 107 is covered by a contact plate 107b of brass or other conducting material which, during each rotation, for a portion of the cycle of switch 107, closes a connection of the excitation circuit for the magnet 117.

A latching plate 115 is secured to the end of the carrier shaft 103 and is so adjusted and rigidly mounted relative to phase-transmitter 106 and collector switch 107 that, when the electromagnet 117 is energized and moves the latch pins 113 upwardly, these pins enter into mating notches of disk 115 and then prevent any further rotation of shaft 103 and workpiece 101.

For automatic performance of the entire balancing process, the slow revolution of the workpiece, after completion of the unbalance analysis, and the subsequent arresting of the workpiece in the correct angular position must be mechanized. While in the above-described embodiment of Fig. 4, a gear motor 45 is provided for this purpose, automatic turning of the workpiece to the arresting position in the embodiments of Figs. 6 to 8 is controlled by a switching device in conjunction with an eddy-current brake 185, 186.

The eddy-current brake comprises a copper disk 186 mounted on the shaft of drive motor 116 (Fig. 6) and an electromagnetic field system equipped with a field coil 185. The control switch 183 for slow turning of the workpiece is a two-pole two-position switch. When switch 183 is in the position "Balance," it supplies the drive motor 116 directly with full line-voltage through the switch contact 183a. After completion of the measuring run, the selector switch 183 is shifted to the position "Clutch." This is preferably done automatically by means of a centrifugal switch 187 (Fig. 7) which responds when the drive motor 116 is disconnected from the line and has decelerated to below a given slow speed. The contact 183a (Fig. 6) of switch 183 now supplies the motor 116 with reduced voltage from a transformer 184. At the same time, the switch contact 183b supplies full line voltage to coil 185 of the brake magnet which induces in the copper disk 186 eddy-currents that impart a counter-torque to the motor. This secures the desired slow turning speed for the workpiece 101 as required for reliably arresting the workpiece in the correct angular position.

The embodiment illustrated in Figs. 9, 10 and 11 is designed to individually analyze the angular position and magnitude of unbalance and to thereafter perform the entire balance correcting operation automatically.

The apparatus is equipped with a generator 222 of special design, and a moving coil instrument 201, preferably a so-called cosine-meter according to Bruger. The instrument 201 has two pole pairs 202a, 202b and 203a, 203b angularly displaced 90° relative to each other. A moving coil 204a is mounted between the pole pairs on a shaft 204b rotatable 360°. The shaft 204b carries a magnetic armature 205 which also serves as a pointer and is movable along a scale 206 divided into 360°. The instrument housing carries a magnetizable ring 207 by means of which the pointer-armature 205 can be arrested in any desired position. Such an instrument can readily be mounted at a location where a visible indication, mainly for checking purposes, is desired.

A switch 208 (Figs. 9, 11) serves to connect the instrument 201 with the generator 222 serving as a phase transmitter. The rotor 216 of generator 222 is mounted on the lower end of the balancing-machine driving spindle 212 which carries the workpiece 105 to be processed. A belt sheave 114 serves to drive the machine spindle 212 and the workpiece 105 together with the rotor 216 of generator 222 and a centrifugal switch 215, all in synchronism and fixed phase relation. The bearing assembly 104 in which the spindle 212 is journalled is oscillatorily supported by two pairs of leaf springs schematically indicated at 220. During the rotation of the workpiece 105, any oscillations of the bearing assembly 104 due to unbalance are responded to by oscillations pickups of which one is shown at 209 (Figs. 9, 11). The particulary type of pickup is not essential, although I prefer using an electrodynamic moving-coil pickup. The pickup translates the unbalance oscillation, during the measuring run of rotor 105, into electric alternating voltages.

The stator of generator 222 is similar to that of the instrument 201 in comprising two pole pairs 218a, 218b and 219a, 219b (Fig. 11) 90° displaced from each other. A stationary magnetizable ring 211 (Figs. 9, 11), as soon as it receives electric current, attracts a disk 229 secured to the machine spindle 212 and then prevents further rotation of spindle 212 and workpiece 105. The centrifugal switch 215 is so set that it prevents the electromagnetic ring 211 to be switched on when the revolving speed of the machine spindle is too high. The field winding on the rotor 216 of generator 222 can be selectively energized through two slip rings (not shown) and through the switch 208 (Fig. 11) by alternating current from an alternating-current supply line 208a, or by direct-current from a D.-C. supply line 208b (Figs. 9, 11). Located above the workpiece 105 on spindle 212 is a drill press with a tool 4 mounted on a vertically displaceable spindle 4c.

Fig. 10 shows a schematic circuit diagram of the device according to the invention for determining the magnitude of unbalance. For this purpose, I also prefer using the wattmetric principle because of its inherent filtering effect which makes the performance independent of the revolving speed of the workpiece being tested and also independent of any vibrations other than those caused in the bearing assembly by unbalance of the workpiece. According to Fig. 10, I provide a twin wattmeter 300 with two systems of coils located one above the other. Such a twin wattmeter and its application for unbalance testing purposes is described in Patent 2,706,399 to which further reference may be had if desired. However, an example of wattmeter design, circuitry and performance will be described presently with reference to the particularities of the present invention.

The twin wattmeter 300 has two moving coils 301a and 301b mounted on a common shaft 302 for cooperation with two respective pairs of field coils 303a and 303b mounted one above the other. The upper field-coil pair 303a is supplied with the sine-wave current from generator 222, and the lower field-coil pair 303b is supplied with the cosine-wave current of generator 222 (or vice versa). The two moving coils 301a, 301b are both supplied with the alternating voltage of the electrodynamic oscillation pickup 209. According to the invention, the two moving-coil systems are so designed, for instance by correspondingly shaping the pole shoes, that the instrument shaft 302 has a squared deflection characteristic, whereby the total deflection becomes equivalent to the sum of the component voltages effective in the upper and lower coil systems respectively. Accordingly, the armature-pointer 305 mounted on instrument shaft 302 indicates on a scale 306 the square value of the pickup voltage. If a linear scale division is desired, then a countertorque is imparted to the instrument shaft 302, for instance by means of a return spring 307 of square characteristic (according to the equation $b = \sqrt{a^2 + c^2}$).

The armature-pointer 305 carries at its pointer end a contact which moves along a row 308 of individual contacts and, when in indicating position, is caused to connect one of these contacts, for instance the contact 308a. It will be recognized that in this respect the instrument-controlled contact device is similar to the one described above with reference to Fig. 8 (see also U.S. Patent 2,722,830 Figs. 15, 16). A stepping switch 310, preferably of the standard rotary-selector type, has its bank contacts 309 manifold-connected by a group 306 of parallel wires with the individual contacts of row 308 so that the pointer 305 of instrument 300 becomes electrically connected with a selected one of the bank contacts 309 depending upon the deflecting position occupied by the pointer 305.

The apparatus as a whole operates as follows:

During the balancing run, while workpiece 105 is being driven to rotate at the desired speed, the switch 208 occupies the position illustrated in Figs. 9 and 11. The generator 222 has its rotor 216 energized by direct current from supply line 208b and passes from its coil pair 218a, 218b a sine-wave current through the instrument coils 202a, 202b. Simultaneously a cosine-wave current passes from generator coil pair 219a, 219b through the instrument coils 203a, 203b. Assuming that the workpiece 105 is unbalanced, the bearing assembly 104 (Fig. 9) performs oscillations within a horizontal plane with an oscillation amplitude proportional to the amount of unbalance. These oscillations are translated by the electrodynamic pickup 209 into alternating voltages which are applied to the moving coil 204a of instrument 201. As a result, the moving coil 204a with the armature-pointer 205 adjusts itself to a deflection corresponding to the phase displacement between the pick-up voltage and the two voltages of the auxiliary generator. If desired, the angular position of the unbalance can then be directly read off the scale 206 in angular degrees.

After the pointer 205 has thus adjusted itself, the magnetizable ring 207 (Fig. 9) receives current under control by a timing relay $T_R$ and attracts the armature-pointer 205 with sufficient force to lock itself as well as the moving coil 204a securely in position so as to retain the indicating deflection after the drive motor of the balancing machine is switched off. Thereafter, as soon as the revolving speed of the machine spindle 212 has declined sufficiently, the centrifugal switch 215 energizes the magnet coil 208a of switch 208. This has the effect of disconnecting the direct-current line 208b from the rotor 216 of generator 222 and instead connecting the rotor 216 as well as the moving coil 204a of instrument 201 to the alternating-current line 208a. Now the rotor 216 and the moving coil 204 receive alternating currents of the same frequency and the same phase. These currents induce in coils 218a, 218b and 219a, 219b on the one hand, and in coils 202a, 202b and 203a, 203b on the other hand, respective voltages which differ from each other to the same extent as the angular positions of rotor 216 and moving coil 204a in the respective appertaining systems are different from each other. As soon as the rotor 216 of generator 222, by turning of the workpiece 105, has attained the same angular position as the blocked coil 204a, the equalizing current flowing between the two systems 202a, 202b, 203a, 203b on the one hand, and 218a, 218b, 219a, 219b on the other hand, becomes zero. This causes a twin relay 221a, 221b (Fig. 11) to respond and to actuate a switch 223 which energizes the magnet ring 211 (Figs. 9, 11). The disk 229 (Fig. 9) is attracted and arrests the machine spindle 212 and thus the workpiece 105 in the correct angular position needed for the operation of drill 4 to produce balance.

Instead of setting the workpiece 105 into the proper angular position for operation of the tool, the apparatus according to the invention as illustrated in Figs. 9 to 11 may also be used by first placing the workpiece into a given zero position and arresting it in that position, and thereafter placing the machining tool 4 into the accurate angular position. Before explaining this more in detail, it may be mentioned that an apparatus according to Figs. 9, 10 and 11 may be incorporated into machinery of the same appearance and exterior design as the machine illustrated in Fig. 1 and described above. In such a machine, the balancing machine portion proper modified in accordance with Fig. 9, is located in the housing 1a (Fig. 1), the electric balance analysing equipment is mounted within the housing portion 1b and has the instruments 201 and 300 positioned as shown in Fig. 1, and the generator 222 according to Figs. 9, 10 and 11 is located at the same place as the generator 9 shown in Fig. 1. The machining tool for the apparatus according to Figs. 9 to 11 is mounted on the standard 1c (Fig. 1)

and comprises the components 4 and 4a to 4e as described above with reference to Fig. 1.

It will be noted from Fig. 1 and Fig. 9 that the tool 4 is mounted in eccentric relation to the axis of rotation 105a of the workpiece 105 to be balanced. After the workpiece 105 is arrested in a given zero position, the tool support is rotated relative to this zero position about the axis 105a. For this purpose, the tool holder 4c is rotatably displaceable about the axis 105a by means of a control device 4e which comprises a worm gear transmission 217a (Fig. 9). The worm shaft is driven by a pair of spur gears 225. Mounted on the driving shaft 226 of the spur gear transmission is a coil 227 between stationary coils 228a and 228b. When the armature-pointer 205 of the instrument 201 is arrested in a position corresponding to the unbalance angle of the workpiece 105 and stays arrested in that position after the machine spindle 212 and the workpiece 105 are no longer driven, then the moving coil 204a of instrument 201 and the coil 227 of the drill control device 4e within its housing (Fig. 1) are excited by alternating current due to the above-mentioned change in setting of the control switch 208. As a result, differential currents occur between coils 228a, 228b on the one hand, and coils 202a, 202b and 203a, 203b on the other hand. These differential currents are dependent upon the difference in phase position of moving coil 204a and generator rotor 216 relative to the respective stationary coil systems 202a, 202b, 203a and 203b on the one hand, and 218a, 218b, 219a, 219b on the other hand. As a result, the worm-gear shaft 226 of the drill control device 4e is turned and actuates through gears 225 the worm gearing 217a as well as the tool carrier 4c until the phase difference is eliminated. This places the drill 4 at the location above the arrested body 105 where the previously determined unbalance is to be eliminated by drilling material away from the workpiece 105.

As soon as the drive of the balancing machine portion (corresponding to motor 8 in Fig. 1) is deenergized and the workpiece 105 has attained the correct angular position in front of the drilling tool, the tool drive motor 4d (Fig. 1) for the drill is placed in operation. After the drill tip hits upon the workpiece 105 (Fig. 9), the drilling operation is automatically controlled so that the drill penetrates to a depth corresponding to the previously determined magnitude of unbalance. Such control is effected by the impulse method disclosed in my copending application Serial No. 238,649, filed July 26, 1951, assigned to the assignee of the present application and now issued as Patent No. 2,810,307. Accordingly, as soon as the drill points hits upon the workpiece 105, an impulse transmitter 311 (Fig. 10) issues control pulses which are applied to the stepping magnet 312 of the rotary selector switch 310 and which advance the switch, step by step, until the contact arm 313 of the rotary selector engages the particular bank contact, for instance the contact 308a, which at that time is electrically connected with the armature-pointer 305 of the instrument 300.

As soon as this connection is established, a relay 330 is energized through a contact bar 313a of the rotary selector switch by current flowing through the instrument shaft 302, the contact arm 305, the bank contact 308a, the contact arm 313 and the bar 313a. Relay 330 opens the circuit for the stepping magnet 312 so that the stepping operation is discontinued. This terminates the drilling operation and initiates the return movement of the drilling tool away from the workpiece.

The balancing operation is now completed, and the balance correction has been carried out by the machining operation at the accurate place and by the necessary amount.

In the embodiments of the invention described so far, the machining or other fabricating operation required for correcting the previously analyzed unbalance of the workpiece takes place while the workpiece remains mounted on the carrier of the balancing machine on which the workpiece was previously kept in rotation to perform unbalance-responsive oscillation. Although the vibratory carrier and bearing assembly of the balancing machine can be rigidly locked during the subsequent balance-correcting operation in order to be protected from becoming damaged due to that operation, it is often desired to provide a separate machine tool or fabricating device on which the balance-correcting operation is performed away from the balance-analyzing equipment.

The embodiment of the invention illustrated in Figs. 12 to 19 is of the latter type. This machine comprises a balancing machine assembly 412 of any desired type and design which is provided with a control and measuring desk 411 and is mounted on a base 413 which also carries a milling machine 414 serving as the balance-correcting machine tool (Figs. 12, 13).

After the workpiece is analyzed for unbalance, it is removed from the balance-analyzing portion of the machine and is inserted into the chuck or workpiece carrier of the balance-correcting machine; and, according to the invention, the two machine portions are interconnected by control apparatus which causes the workpiece, when being inserted into the balance-correcting machine, to constrainedly assume the correct position in front of the machining tool. While the features and principle of my invention embodied in the machine of Figs. 12 to 19 are illustrated and described with reference to the particular example of a milling machine for balance correction, it should be understood that the invention is analogously applicable with other types of balance-correcting devices. The invention is particularly suitable for automatically operating balancing machines operating on a vectorial balance-measuring principle according to U.S. Patent No. 2,722,830; and the illustrated embodiment involves such a measuring principle.

Generally, the indicating instrument of such a machine, as shown in Fig. 16, has its indicating face 401 provided with a polar diagram of indicia. In Fig. 16, the concentric circles of the diagram, denoted by 10g, 20g, and 30g, indicate the magnitude of unbalance in grams. The indication in the illustrated embodiment is effected by means of a light mark 402. If this mark, for example, indicates the unbalance of a disk-shaped workpiece as 20 grams at an angle α relative to a basic reference line L (Fig. 16), then the subsequent balance-correcting operation must remove from the too-heavy spot of the workpiece, for instance by milling, a certain amount of material, or must add to the too-light spot, for instance by welding, a certain amount of material which in either case has the arcuate length a, the depth b and the width c (Figs. 14, 17) and which has the gravity or mass center S located on the radius R at the angle α relative to the basic reference line L (Fig. 17). According to the features of my invention now to be explained with reference to the embodiment of Figs. 12 to 19, the required elimination (or addition) of material can be uniformly effected in a single pass of fabricating operation on both sides of the radius R and on both sides of the unbalance mass center S, the particular embodiment, of course, relating only to the elimination of material from the workpiece by milling.

The workpiece 403, exemplified by a flywheel, is mounted on a workpiece carrier 413 rotatable about a vertical axis as is preferable for the balancing of workpieces of such type. The drive for the workpiece carrier 413 is not illustrated as it may be similar to those shown in Figs. 1 to 6. The electric drive motor is mounted within the housing of the machine 412 (Fig. 12).

The milling machine 414, mounted on a base portion 415 of the machine, comprises a supporting table 416 for the workpiece. The table 416 can be turned by means of a handwheel 416a or by means of a motor about a vertical pivot shaft 417 in order to place the workpiece 403 into proper position in accordance with the unbalance angle previously determined on the balance-analyzing portion of the machine. A lever 417a and a clamping cheek 417b serve to firmly clamp the workpiece 403 to the support 416. The milling cutter 418 is journalled on a tool-carrier 418a which is displaceable upwardly and downwardly along a standard 418d and is driven by a tool-drive motor 418g through a counter gearing 418b. The milling machine 414 as such is not essential to the invention proper and may be of any desired design.

The workpiece 403 and the workpiece support 417 are each provided with a mark, preferably consisting of a groove 404 and a mating key 426f, respectively, in order to facilitate securing the accurate angular position for the balance-correcting operation.

The values of magnitude and angular position of unbalance, determined by a measuring run of the workpiece on the balance-analyzing machine 412 and indicated by the device 401 (Fig. 12), are transmitted to the workpiece support 417 of the milling machine 414 by means of a setting apparatus 421 and a gear transmission 426. The device 421 is provided with a knob 422a (Figs. 12, 18, 19) having a scale 422b calibrated in angular degrees from 0° to 360°. The knob can be turned in the direction of arrow 422d (Fig. 18) to adjust the scale relative to a fixed zero mark 422c to the unbalance-angle indication, for instance 120°, of the measuring instrument 401. A second knob 423a is provided with a scale of indicia calibrated in magnitudes of unbalance. The rotary adjustment of knob 423a relative to a fixed zero mark 423c translates each particular value of unbalance magnitude, for instance 20 grams, into an arcuate length $a$ according to Fig. 17.

The adjusting movement of either one of knobs 422a and 423a is transmitted by respective shafts 424, 425b to the gear mechanism 426 (Fig. 12) which transmits this movement through a shaft 426b and a bevel gearing 426c to the shaft 426d on which the workpiece supports of the milling machine are mounted (416). The upper end portion 426e (Fig. 15) of shaft 426d is provided with the above-mentioned key 426f which matches, and enters into, the groove 404 of the workpiece 403. The gear mechanism 426 may consist of a spur-gear differential transmission. It has the purpose to reduce the arcuate path of motion corresponding to the adjustment of the knobs 422a and 423a to proportionately smaller values as required for the proper adjustment of the workpiece support in the milling machine. In addition, the gear mechanism 426 serves to re-transmit to device 421 the angular displacement of the workpiece support when the balance-correcting operation is being performed in order to permit controlling this operation, as well be more fully described in a later place.

As explained, turning of knob 422a (Figs. 12, 18, 19) has the effect of setting the key 426f at the upper end 426e of the vertical shaft 426d (Fig. 15) into the angular position of unbalance $\alpha$ indicated by the instrument 401 (Fig. 16). Such angular setting must thereafter remain invariable until the corresponding balance-correcting operation is being performed by the milling tool. For that reason, the shaft 424 (Figs. 12, 19) is continuously kept arrested by an electromagnetic device 424a (Fig. 19) acting as a brake. The brake 424a can be released by depressing the knob 422a (Fig. 19). Then a flange 424b on shaft 424 actuates a switch 424c which interrupts the magnetizing current of the magnetic brake 424a. In the depressed position of knob 422a, the shaft 424 is readily rotatable. When the knob is released by the attendant, a spring 424d shoves the shaft 424 together with flange 424b and knob 422a upwardly, and the magnetic brake 424a becomes again effective to prevent rotation of the shaft.

Assume that the workpiece 403 is placed into the milling machine with groove 404 in mating engagement with key 426f (Fig. 15), and that the key 426f has previously been adjusted to the correct angular position as described in the foregoing. Then the gravity center S (Fig. 17) of the amount of material to be eliminated from the workpiece would be spaced from the basic reference line L by the arcuate amount $\alpha$ and hence would be located precisely in front of the milling tool 418 (Fig. 13). This angular position of the workpiece, however, would be impractical for performing the balance-correcting milling operation because it would be necessary to move either the milling cutter or the workpiece away from the gravity center S by the amount ½$a$ toward the right as well as toward the left. For that reason, the illustrated machinery is so designed that the adjustment of the amount of tool feed by means of knob 423a in accordance with the previously measured magnitude of unbalance is controlled by having the shaft end 426e (Fig. 15) with key 426f automatically turned a further extent corresponding to the arcuate distance ½$a$. As a result, the radius R (Fig. 17) of the workpiece 403 becomes spaced from the basic reference line L by the arcuate amount $$\alpha + \frac{a}{2}$$

That is, the milling tool is now located opposite one end of the arcuate distance along which the workpiece is to be machined for eliminating the unbalance. Consequently, the milling operation need be performed in only one direction of tool progression along the workpiece at a location determined by the angular position ($\alpha$) determined by the preceding unbalance analysis and by a magnitude ($a$) determined by the previously analyzed magnitude of unbalance.

To secure this performance, two step-up transmission gears 425e and 425f are provided between the end 425b of shaft 425 and the shaft 425d leading to the transmission 426 (Figs. 19, 12). The spur gear transmission 425e, 425f has the effect of translating the amount of arcuate travel of knob 423a to twice that amount at shaft 425d. To prevent the shaft portion 425d from rotation, it is normally blocked by an electromagnetic device 425a which operates in the same manner as described above for device 424a. When the knob 423a, for changing its setting, is being depressed, it actuates a contact switch 425c which interrupts the energizing current of the electromagnetic device 425a. When the knob 423a is released by the operator, a spring 425g forces shaft 425 and knob 423a upwardly back into the normal position so that the switch 425c again supplies current to the electromagnetic device 425a to thereby lock the shaft 425d.

The milling depth $b$ (Figs. 14, 17) and width $c$ (Fig. 14) remain the same for all workpieces of the same kind and size, such as all workpieces of a series. For the purpose of the invention, therefore, a disk-shaped milling tool of the width $c$ may be provided and may be equipped with a rotatable stop ring on one side or on both sides of the row of cutter teeth so that the stop rings automatically prevent the cutter from penetrating into the workpiece more than to the proper depth $b$. In Fig. 14, two such rotatable stop rings of the cutter 418 are shown at 418e and 418f.

In the illustrated embodiment, the automatic control of the balance-correcting operation in accordance with the milling length $a$, corresponding to the previously determined magnitude of unbalance, is effected with the aid of a stepping mechanism controlled by electric impulses fundamentally in the manner of the rotary selector switches used in telephone exchanges. When the spur gear 425f (Fig. 19) for adjusting the shaft 425d is being turned, the spur gear, meshing with a pinion 427b on a shaft 429c, also turns a dog 429 which actuates a current interrupter contact 430. The interrupter issues current pulses to a stepping mechanism 427. As a result, the stepping mechanism 427 is advanced in accordance with the angular setting of knob 423a so that the residual travel distance of the stepping mechanism 427, always progressing in one and the same direction, is proportional to the required feeding movement of the milling cutter. That is, the stepping mechanism 427 has a member which is rotatable 360° and, by operation of the knob 423a, is rotated from a zero position to a certain other position so that the remaining travel of the movable member required to thereafter rotate it forward to the zero position corresponds to the required feed movement of the milling cutter.

After the workpiece 403 is analyzed for unbalance in the balance-analyzing portion of the machine and after the two knobs 422a and 423a are set by the operator in the above-described manner in accordance with the indicated values of unbalance magnitude and unbalance angle, the workpiece is transferred into the milling machine portion also as described in the foregoing. For performing the balance-correcting operation, the attendant now moves the milling cutter 418 into cutting position by means of the levers 418c and 418h (Figs. 12, 13) and then places the cutter in rotation by means of the cutter drive 418g. A spring 431 (Fig. 13) then presses the cutter elastically against the workpiece 403 which, as explained, is firmly secured to the supporting table 416 in the proper angular position. A latch 432 blocks the cutter in the working position, while the workpiece 403 on the supporting table 416 is slowly turned about the table axis by means of handwheel 416a or automatically, in order to perform the milling operation. This rotary feed movement of the workpiece 403 during milling operation is transmitted through shaft 426d (Fig. 12), bevel gearing 426c, shaft 426d and transmission 426 back to the shaft 425d and thus also back to the spur gear 425f (Fig. 19) which is mounted on shaft 425d and is in meshing engagement with the pinion 427b. At that time, the arresting device 425a for shaft 425d is deenergized and released by means of a contact 428a (Fig. 13) which is mounted on the standard 418d and is actuated by the displacement of the standard into the milling position, such displacement being effected, as described, by operation of the handwheel 416a. Consequently, during milling operation, the shaft 425d (Figs. 12, 19) is released for rotation and can follow the feed-back movement transmitted through shaft 426b and transmission 426. As a result of such feed-back movement, the spur gear 425f and the pinion 427b (Fig. 19) again actuate the interrupter 430 which issues another series of current pulses to the stepping mechanism 427 until this mechanism is advanced to its zero position. As soon as the zero position is reached, a dragging contact 428 of the stepping mechanism 427 issues a current pulse to an electromagnetic device (not illustrated) which moves the latch 432 (Fig. 13) out of the latching position. At the same moment, the milling operation ceases because the spring 431a now pulls the standard 418a and the milling cutter 418 away from the workpiece 403. Now the balance-correcting operation is completed in accordance with the requirements determined by the preceding unbalance analysis. Consequently, the strip of material milled away from the workpiece and having the depth b and the width c has always accurately the length a required for establishing balance of the workpiece.

While in the embodiment described with reference to Figs. 12 to 19, the balance-correcting operation is performed by milling material from the periphery of the workpiece, it will be understood that essential features and principles of my invention described with reference to that embodiment are also applicable by effecting the balance correction, that is, removing or adding material, at any desired other location of the workpiece and with the aid of any other fabricating device suitable for such purposes.

It will be apparent from the above-described examples that my invention is amenable to a variety of modifications; and it will be understood by those skilled in the art, upon a study of this disclosure, that the invention may be embodied in machines other than those particularly illustrated and described, without departing from the essential features of my invention and within the scope of the claims annexed hereto.

I claim:
1. With a balancing apparatus for a rotatable workpiece, comprising a rotatable workpiece carrier, drive means connected with said carrier for rotating it, an alternating-current generator having a rotor connected with said carrier to rotate in synchronism with the workpiece and a stator angularly adjustable for phase adjustment of the generator current, electric pickup means responsive to workpiece oscillation due to unbalance, and a wattmetric device connected to said generator and to said pick-up means whereby the angular position of said stator is indicative of the angular position of workpiece unbalance when said stator is set for zero response of said wattmetric device, the combination of unbalance-correcting fabricating means engageable with the workpiece on said carrier when said carrier is arrested, and a controllable arresting device for securing the rotatable workpiece in proper angular position for balance-correcting fabrication, said arresting device having a rotationally adjustable first member connected with said stator to be rotated in fixed relation to angular displacement of said stator and having a second member engageable by said first member and connected with said carrier to rotate together therewith, and control means connected with said arresting device for actuating it to arrest the workpiece in a position depending upon the rotational adjustment of said first member, said control means having two co-active parts for issuing a control pulse, one of said parts being rotatable in synchronism with said carrier and the other part being rotatable in synchronism with said stator, whereby a pulse actuating said arresting device is issued when the workpiece is turned to said proper angular position.

2. Apparatus for correcting unbalance of a rotatable workpiece in two correction planes, comprising a rotatable carrier to receive the workpiece in a fixed angular relation to the carrier, drive means connected with said carrier for rotating said carrier, alternating-current generator means having a rotor connected with said carrier to rotate in synchronism therewith and having a stator angularly adjustable about the rotor axis for phase displacement of the generator current, electric pickup means responsive to carrier oscillation due to unbalance of the rotating workpiece, and a wattmetric device connected to said generator means and to said pickup means whereby the angular position of said stator is indicative of the angular position of workpiece unbalance when said stator is set for zero response of said wattmetric device, in combination with unbalance-correcting tool means engageable with the workpiece on said carrier when said carrier is arrested, and at least one controllable arresting device for securing said carrier in correct position relative to said tool means for balance-correcting operation in said respective correction planes, said arresting device having two mutually engageable members of which one is mechanically joined with said carrier to rotate together therewith, two selectively operable control devices connected with said arresting device for actuating it individually in response to a control pulse, said control device having a first part connected with said carrier to rotate together therewith and having a second part rotatable in synchronism with said stator and engageable by said first part for issuing a control pulse when said carrier is turned to said correct position.

3. Apparatus for correcting unbalance of a rotatable workpiece by a fabricating operation, comprising a drive for rotating the workpiece about the rotation axis of the workpiece, a balance measuring device having a pickup responsive to unbalance vibrations of the workpiece when the workpiece is being driven by said drive and having an angularly displaceable indicating member whose angular position is indicative of that of the workpiece unbalance being measured, workpiece carrier means and fabricating tool means of which one is rotatably adjustable relative to the other about the axis of said carrier means to place tool and workpiece relative to each other in position for unbalance correction, a position control device engageable with said rotatably adjustable means for arresting it in said unbalance-correcting position, and an electric control circuit having signal transmitter means connected with said angularly displaceable member of said balance measuring device to be controlled thereby, said control circuit having receiving means electrically connected with said transmitter means and mechanically connected with said control device for causing it to arrest said rotatably adjustable means only when said latter means reaches said unbalance correcting position.

4. In balance correcting apparatus according to claim 3, said balance measuring device and said transmitter means being located in spaced relation to said tool means and workpiece carrier means so that the workpiece after being balance tested must be transferred to said carrier means, said carrier means having reference means whereby the workpiece when being mounted on said carrier means has a fixed angular position relative thereto, said position control device and said receiving means being joined with said rotatably adjustable one of said carrier means and tool means for pre-adjusting its rotary position relative to the other in accordance with the previously determined magnitude and angular position of workpiece unbalance, whereby the subsequent mounting of the workpiece on said carrier means constrainedly places the workpiece in correct position for balance correction by said tool means.

5. Balance-correcting apparatus according to claim 3, comprising a speed-responsive sensing device connected with said workpiece carrier means so as to respond to the speed of carrier rotation, said sensing device forming part of said electric control circuit so as to permit arresting operation only when the speed of said carrier is below a given magnitude.

6. In balance correcting apparatus according to claim 3, said drive comprising an electric motor drivingly connected with said workpiece carrier and having a given normal speed for balance analysis, selectively controllable speed reducing means connected with said motor for causing it to turn said carrier at creeping speed for operation of said arresting control device, and speed sensing means forming part of said electric control circuit for controlling it to operate said control device only at said creeping speed.

7. Apparatus for correcting unbalance of a rotatable workpiece by a fabricating operation, comprising workpiece carrier means and fabricating tool means, one of said two means being rotatably adjustable relative to the other about the axis of said carrier means to place tool and work-piece relative to each other in position for balance correction; a driving mechanism for rotating the workpiece at testing speed to cause workpiece vibrations due to unbalance, an electric pickup responsive to said vibrations, an alternating-current generator having a rotor connected with said drive means to rotate in synchronism with the workpiece and having a stator angularly adjustable about said rotor for phase adjustment of the generator current, instrument means connected to said generator and with said pickup to exhibit a given indication when the angular adjustment of said stator is indicative of the angular unbalance component of the rotating workpiece, an arresting device having two mutually engageable arresting members of which one is connected with said rotatably adjustable means to rotate together therewith, said arresting device having an electric control circuit for actuating said members to arrest said rotatably adjustable means, said control circuit comprising a normally open switch device having two parts connected with said rotatably adjustable means and with said stator respectively so as to close said switch device only when said two means are in said positions for unbalance correction.

8. An apparatus for correcting dynamic unbalance of a rotatable workpiece by a fabricating operation, which comprises a supporting structure, a workpiece carrier rotatably journalled on said structure, fabricating tool means mounted on said structure and engageable with the workpiece on said carrier, a drive connected with said carrier to maintain it in rotation for determining unbalance of the workpiece, electric pickup means responsive to unbalance vibration of the rotating workpiece, an alternating-current generator having a rotor connected with said carrier to rotate in synchronism therewith and having a stator angularly adjustable about said rotor for varying the phase of the current relative to the carrier rotation, and electric measuring means connected with said pickup means and with said generator for indicating workpiece unbalance in dependence upon the angular adjustment of said stator; in combination with a controllable arresting device having two interengageable arresting members of which one is connected with said carrier to rotate together therewith, said two members being normally disengaged from each other, electric control means connected with said arresting device for causing said two members to arrestingly engage each other, said control means comprising a pulse transmitter having two mutually coactive parts mechanically connected with said rotor and with said stator respectively so as to actuate said arresting device only when said carrier is turned to an angular position determined by the angular position of said stator.

9. In balance correcting apparatus according to claim 8, said measuring means comprising a balance measuring instrument having a moving member deflective in dependence upon said angular position of workpiece unbalance, said instrument having selective contact means controlled by said moving member and forming part of said control means, said pulse transmitter being electrically interposed between said selective contact means and said arresting device for electrically actuating said arresting device when said pulse transmitter together with said workpiece carrier reaches an angular position corresponding to that of said moving member of said instrument.

10. An apparatus for correcting dynamic unbalance of a rotatable workpiece by a fabricating operation, which comprises a supporting structure, a workpiece carrier rotatably journalled on said structure, fabricating tool means mounted on said structure and engageable with the workpiece on said carrier, a drive connected with said carrier to maintain it in rotation for determining unbalance of the workpiece, electric pickup means responsive to unbalance vibration of the rotating workpiece, alternating current supply means having a rotor portion connected with said carrier to rotate together therewith and having a stator portion angularly adjustable about the axis of said rotor portion for varying the phase relation of the current relative to the workpiece rotation, and electric measuring means connected with said pickup means and said current supply means to indicate workpiece unbalance in dependence upon the angular position of said stator portion; in combination with a controllable arresting device having a first member coaxially formed with said carrier to rotate together with the workpiece in a fixed angular relation thereto, said arresting device having a second member engageable with said first member, said second member being rotatably adjustable about the axis of said first member and being connected with said stator portion to be adjusted in fixed relation to the angular adjustment of said stator portion, normally inactive control means connected with said arresting device for causing, when active, said second member to arrestingly engage said first member, said control means having actuator means connected with said stator portion for actuating said control means to operate said arresting device only when said carrier is turned to an angular position determined by the angular adjustment of said stator portion.

11. An apparatus for correcting dynamic unbalance of a rotatable workpiece by a fabricating operation, which comprises a supporting structure, a workpiece carrier rotatably journalled on said structure, fabricating tool means mounted on said structure and engageable with the workpiece on said carrier, a drive connected with said carrier to maintain it in rotation for determining unbalance of the workpiece, balance analyzing means for measuring the magnitude and angular position of workpiece unbalance during rotation of said carrier, a controllable arresting device having a first member rotatable in fixed angular relation to said workpiece carrier and having a second member engageable with said first member in a fixed angular relation thereto, said second member being angularly adjustable in coaxial relation to said first member, adjusting means connected with said second member for adjusting it in accordance with the angular position of unbalance measured by said analyzing means, and electric control means connected with said arresting device and having pulse transmitter means rotatable in fixed relation to said carrier for issuing a control pulse when said carrier is turned to the correct position for unbalance correcting operation of said tool means, whereby said two members are caused by said control pulse to become interengaged for arresting the workpiece in said correct position.

12. With a balancing apparatus for a rotatable workpiece comprising a rotatable workpiece carrier, drive means connected with said carrier for rotating it, an alternating-current generator having a rotor connected with said carrier to rotate in synchronism therewith, said generator having a stator angularly adjustable for phase adjustment of the generator current, electric pickup means responsive to unbalance-responsive oscillation of the rotating workpiece, and a wattmetric device connected to said generator and to said pickup means whereby the angular position of said stator is indicative of the angular position of workpiece unbalance when said stator is set for zero response of said wattmetric device; the combination of unbalance-correcting fabricating means engageable with the workpiece on said carrier when said carrier is arrested, and a controllable arresting device for securing the rotatable workpiece in proper angular position for balance-correcting fabrication, said arresting device having a rotationally adjustable first member connected with said stator to be rotated in fixed relation to angular displacement of said stator and having a second member engageable by said first member and connected with said carrier to rotate together therewith, and electric control means connecting said stator with said arresting device for causing said two members to arrest said carrier when said carrier is turned to a given angular position determined by the angular adjustment of said stator, whereby the workpiece is arrested in said proper position.

13. The method of balance correcting a rotatable workpiece by performing a fabricating operation at the proper angular location of the workpiece, which comprises rotating the workpiece together with a sine-wave cosine-wave generator, passing sine-wave and cosine-wave current from the generator through stationary coil pairs of two wattmetric instruments respectively, passing unbalance-responsive pickup voltage through the respective moving coils of said instruments and exciting the generator by direct current, whereby said instruments by deflection of said moving coils respond respectively to magnitude and angular position of workpiece unbalance; in combination with the subsequent steps of locking the moving coil of the angular-position responsive instrument in deflected position, then exciting the generator and also said latter pair of moving coils by alternating currents of the same frequency and phase so as to induce respective alternating voltages in the stationary coil pair of said latter instrument and in said generator, compensating said two voltages against each other and turning said rotor together with the workpiece into a position in which the resultant voltage is zero whereby said proper location is placed in fabricating relation to a tool device, arresting the workpiece in that position in dependence upon occurrence of zero voltage and then performing the unbalance correcting operation at said location.

14. The method of balance correcting a rotatable workpiece by performing a fabricating operation at the proper angular location of the workpiece, which comprises rotating the workpiece together with a sine-wave cosine-wave generator, passing sine-wave and cosine-wave current from the generator through stationary coil pairs of two wattmetric instruments respectively, passing unbalance-responsive pickup voltage through the respective moving coils of said instruments and exciting the generator by direct current, whereby said instruments by deflection of said moving coils respond respectively to magnitude and angular position of workpiece unbalance; in combination with the subsequent steps of locking the moving coil of the angular-position responsive instrument in deflected position after completion of the balance analyzing operation, securing the workpiece in a given position, exciting the generator and also said latter moving-coil pair by alternating currents of the same frequency and phase so as to induce in the stationary coil pair of said latter instrument and in said generator respective alternating voltages, compensating said two voltages against each other and turning the tool relative to the workpiece into a position in which the resultant voltage is zero, arresting the tool in that position in dependence upon occurrence of zero voltage and then operating the tool for correcting unbalance of the workpiece.

15. Apparatus for correcting unbalance of a rotatable workpiece by a fabricating operation, comprising a drive for rotating the workpiece, workpiece carrier means and fabricating tool means of which one is rotatably adjustable relative to the other about the axis of said carrier means to place tool and workpiece relative to each other in position for unbalance correction, balance analyzing means comprising two wattmetric instruments for indicating magnitude and angular position of unbalance respectively, each of said instruments having a moving coil and stationary coils, an alternating-current generator having a sine-wave output circuit and a cosine-wave output circuit and having a rotor connected with said drive to rotate in synchronism with the workpiece, unbalance-responsive pickup means connected with said moving coils, said two output circuits being connected with said stationary coils of said two respective instruments, said one instrument for response to angular position of unbalance having means for arresting its moving coil after deflection of said moving coil, direct-current supply means and alternating-current supply means, selector switch means connecting said direct-current supply means with said rotor when in switching condition for balance analysis but connecting said alternating-current supply means to said rotor as well as to said latter moving coil when in switching condition for balance correction, and relay means connected with said circuits and responsive to occurrence of a given equalizing voltage in said circuits when said alternating-current supply means is connected to said rotor and moving coil and when said proper position of tool means and carrier means is reached, and an arresting device for securing said proper position, said arresting device being connected with said relay means to be controlled in response to said given equalizing voltage.

16. In balance correcting apparatus according to claim 15, said unbalance-angle responsive instrument having two wattmetric systems comprising two axially aligned moving coils having a common shaft and two groups of stationary coils, said pickup means having a pickup connected with said two moving coils, said two generator circuits being individually connected with said two groups of stationary coils, and said two wattmetric systems having a resultant square-law deflection versus pick-up voltage characteristic.

17. In balance correcting apparatus according to claim 16, said instrument comprising a square-law countertorque spring connected with said common shaft whereby the resultant deflection of said instrument is linearly dependent upon the pickup voltage.

18. Apparatus for balance correction of a rotatable workpiece, comprising a balancing machine portion and a fabricating machine portion mounted in spaced relation to each other, said balancing machine portion having means for measuring the values of magnitude and angular position of workpiece unbalance and having transmitter means for transmitting said values to said fabricating machine portion, said fabricating machine portion having tool means and a workpiece carrier rotatable relative to said tool means for placing the work-piece into proper position relative to said tool means for balance correcting operation, said carrier having means for engaging the workpiece in a fixed angular position relative to the carrier when the workpiece is transferred to, and mounted on, said carrier, and said transmitter means being connected with said carrier for pre-adjusting said carrier in accordance with said transmitted values of magnitude and angular position of unbalance.

19. In apparatus according to claim 18, said tool means having relative to the workpiece on said carrier a balance-correcting working path of strip shape, said strip having fixed depth and fixed width and variable length, said length corresponding to the rotary adjustment of said carrier by said transmitter means in accordance with the amount of unbalance to be corrected.

20. In apparatus according to claim 19, said tool means comprising a rotary cutter, and a stop ring revolvably mounted next to said cutter in coaxial relation thereto, said stop ring being engageable with the workpiece on said carrier to maintain said depth constant.

21. In apparatus according to claim 18, said transmitter means comprising two input members rotatably adjustable in accordance with the magnitude and angular position of workpiece unbalance, said angular-position input member being connected by said transmission means with said workpiece carrier for setting the rotary position of said carrier relative to a fixed reference in accordance with the value of said angular position of unbalance, and said magnitude input member being connected by said transmission with said carrier for changing said rotary carrier position by a displacement dependent upon the value of said magnitude and in the direction required for said tool means to machine the workpiece in a single machining direction along the machining length required for balance correction.

22. Apparatus according to claim 21, comprising a control device responsive to machining travel of said tool means and connected with said tool means for controlling it to be disengaged from the workpiece upon reaching said machining length.

23. Apparatus according to claim 21, comprising a control device of the stepping switch type connected with said magnitude input member to be thereby adjusted from zero position to a stepping position corresponding to said value of said unbalance magnitude, said carrier being rotatable during machining operation of said tool means for passing the workpiece along said machining length, said transmission connecting said carrier with said control device so as to reset said control device to zero position, said control device having a pulse contact operative upon resetting to issue a control pulse, and means connecting said pulse contact with said tool means for terminating said machining operation in response to said control pulse.

References Cited in the file of this patent

UNITED STATES PATENTS

| | | |
|---|---|---|
| 2,054,267 | Ohlson | Sept. 15, 1936 |
| 2,196,039 | Thearle | Apr. 2, 1940 |
| 2,243,379 | Johnson | May 27, 1941 |
| 2,289,200 | Lundgren | July 7, 1942 |
| 2,359,470 | Eddison | Oct. 3, 1944 |
| 2,363,373 | Werner | Nov. 21, 1944 |
| 2,746,299 | Federn et al. | May 22, 1956 |
| 2,748,603 | Wilcox | June 5, 1956 |
| 2,779,217 | Stovall et al. | Jan. 29, 1957 |
| 2,783,649 | Hope | Mar. 5, 1957 |
| 2,792,725 | Lannen | May 21, 1957 |